R. L. PRITCHARD.
PROCESS FOR THE SEPARATION OF FIBERS FROM THE STALKS OF BAST PLANTS AND OTHER ADHERENT FIBERS.
APPLICATION FILED MAR. 3, 1915.
1,315,328.
Patented Sept. 9, 1919.
8 SHEETS—SHEET 1.
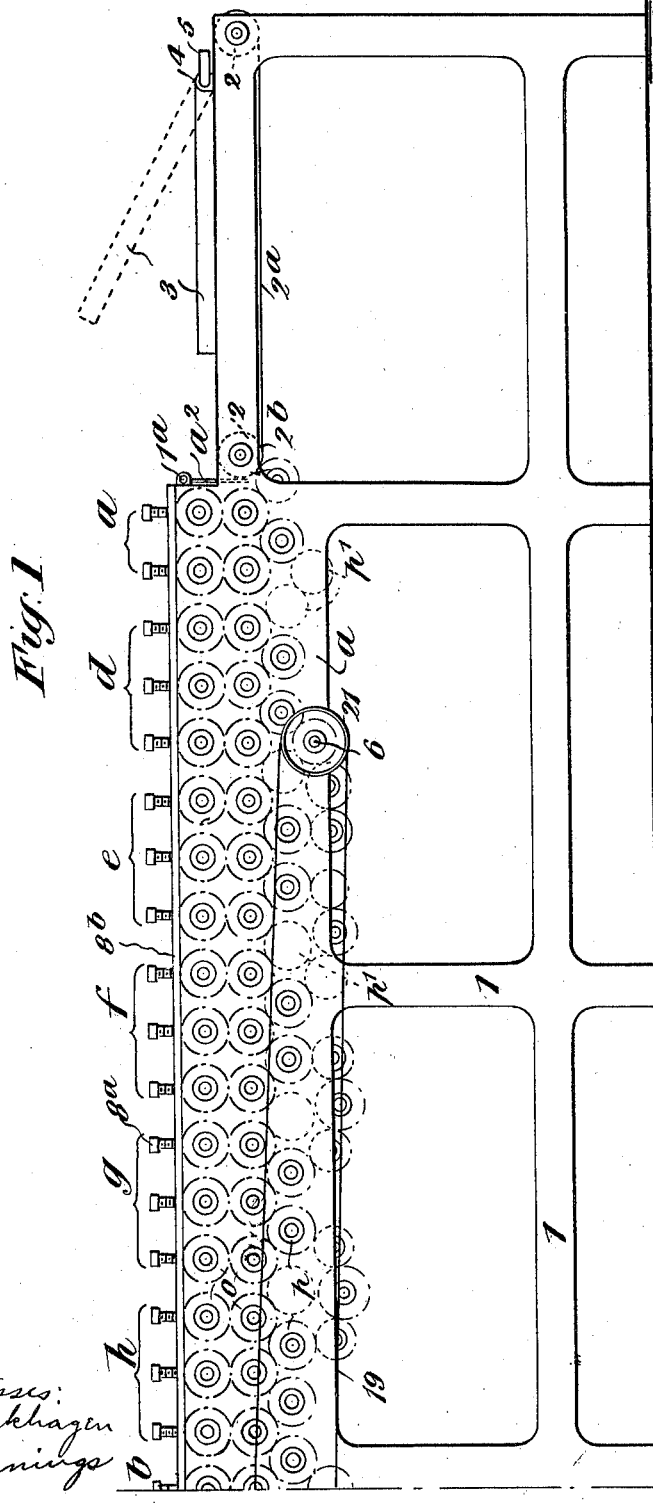

R. L. PRITCHARD.
PROCESS FOR THE SEPARATION OF FIBERS FROM THE STALKS OF BAST PLANTS AND OTHER ADHERENT FIBERS.
APPLICATION FILED MAR. 3, 1915.
1,315,328.
Patented Sept. 9, 1919.
8 SHEETS—SHEET 2.
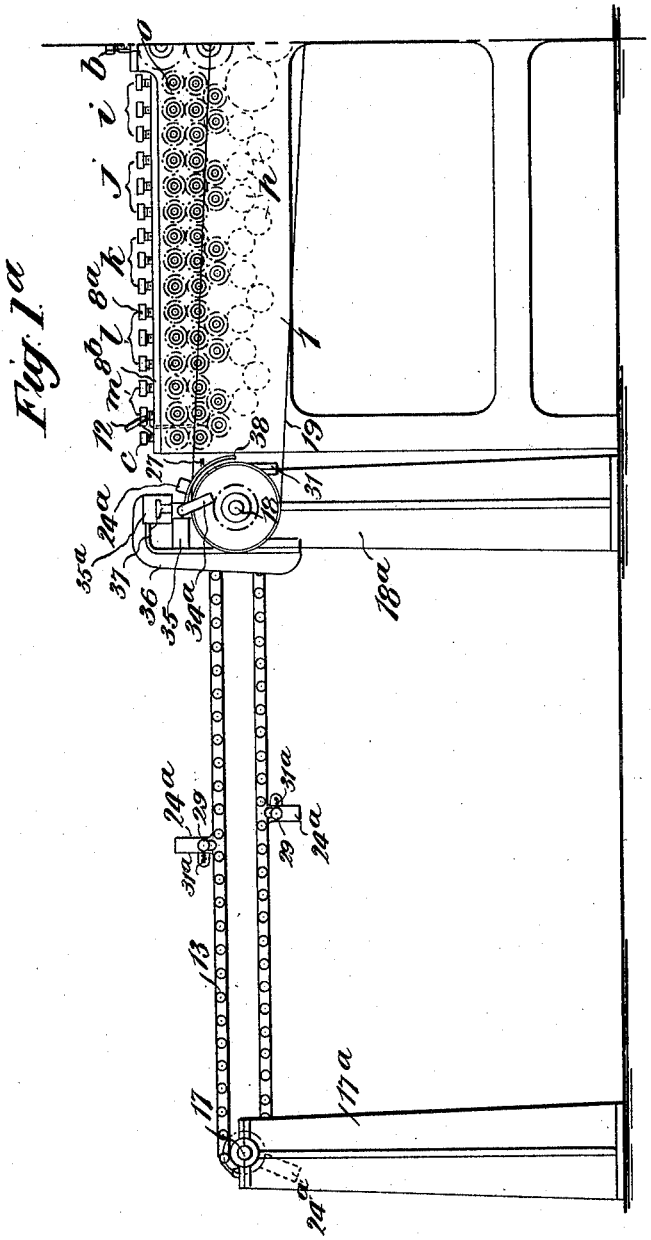

R. L. PRITCHARD.
PROCESS FOR THE SEPARATION OF FIBERS FROM THE STALKS OF BAST PLANTS AND OTHER ADHERENT FIBERS.
APPLICATION FILED MAR. 3, 1915.
1,315,328.
Patented Sept. 9, 1919.
8 SHEETS—SHEET 3.
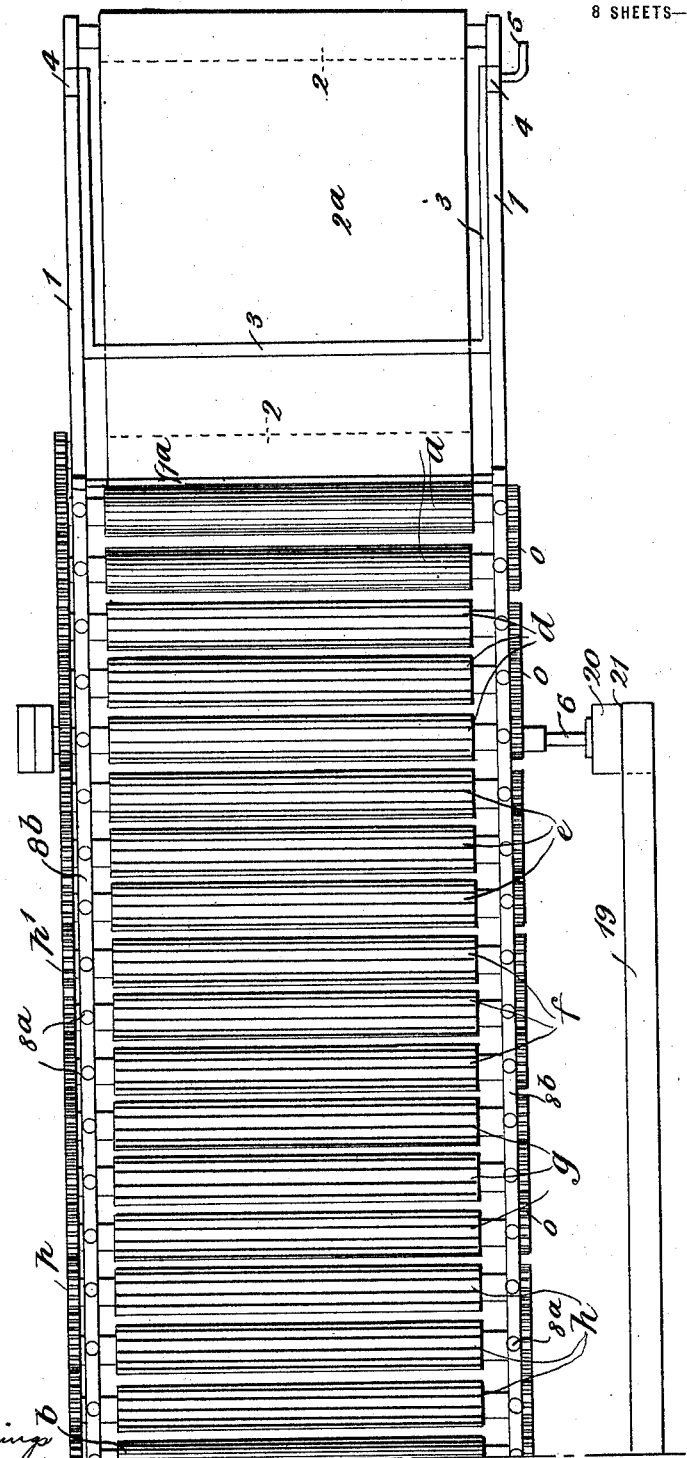

R. L. PRITCHARD.
PROCESS FOR THE SEPARATION OF FIBERS FROM THE STALKS OF BAST PLANTS AND OTHER ADHERENT FIBERS.
APPLICATION FILED MAR. 3, 1915.
1,315,328.
Patented Sept. 9, 1919.
8 SHEETS—SHEET 4.
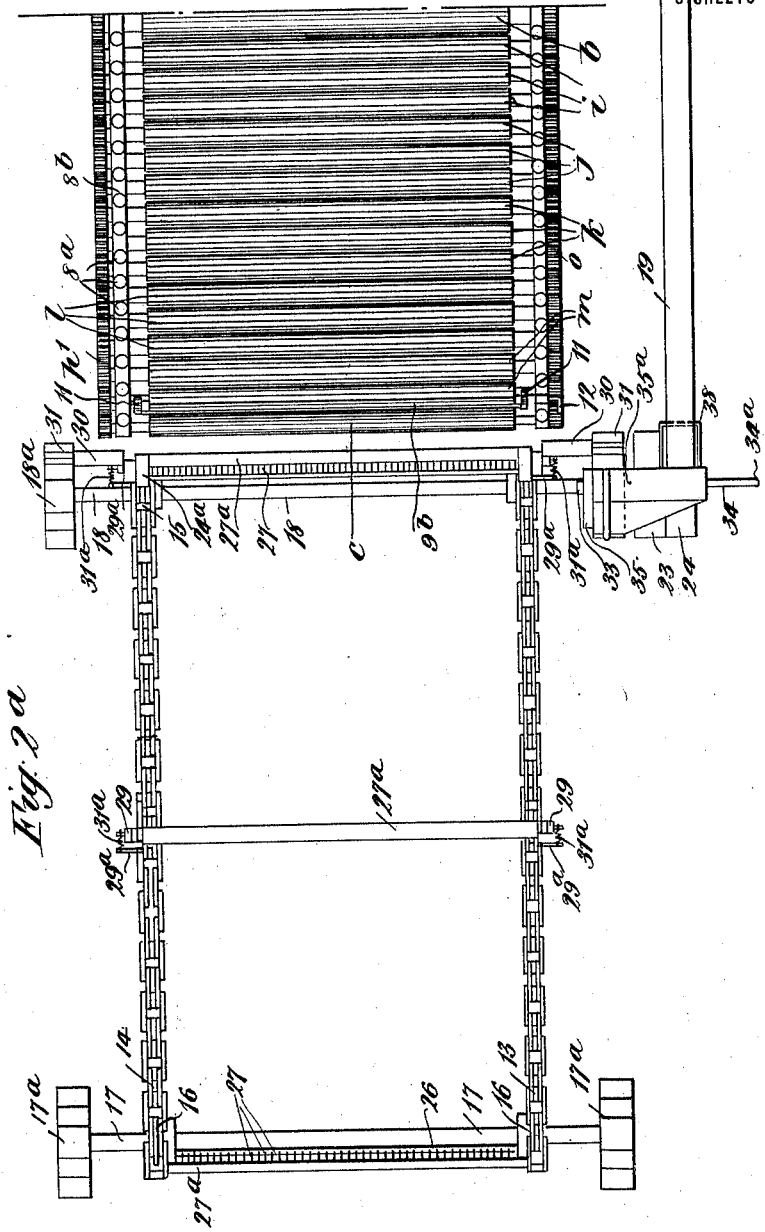

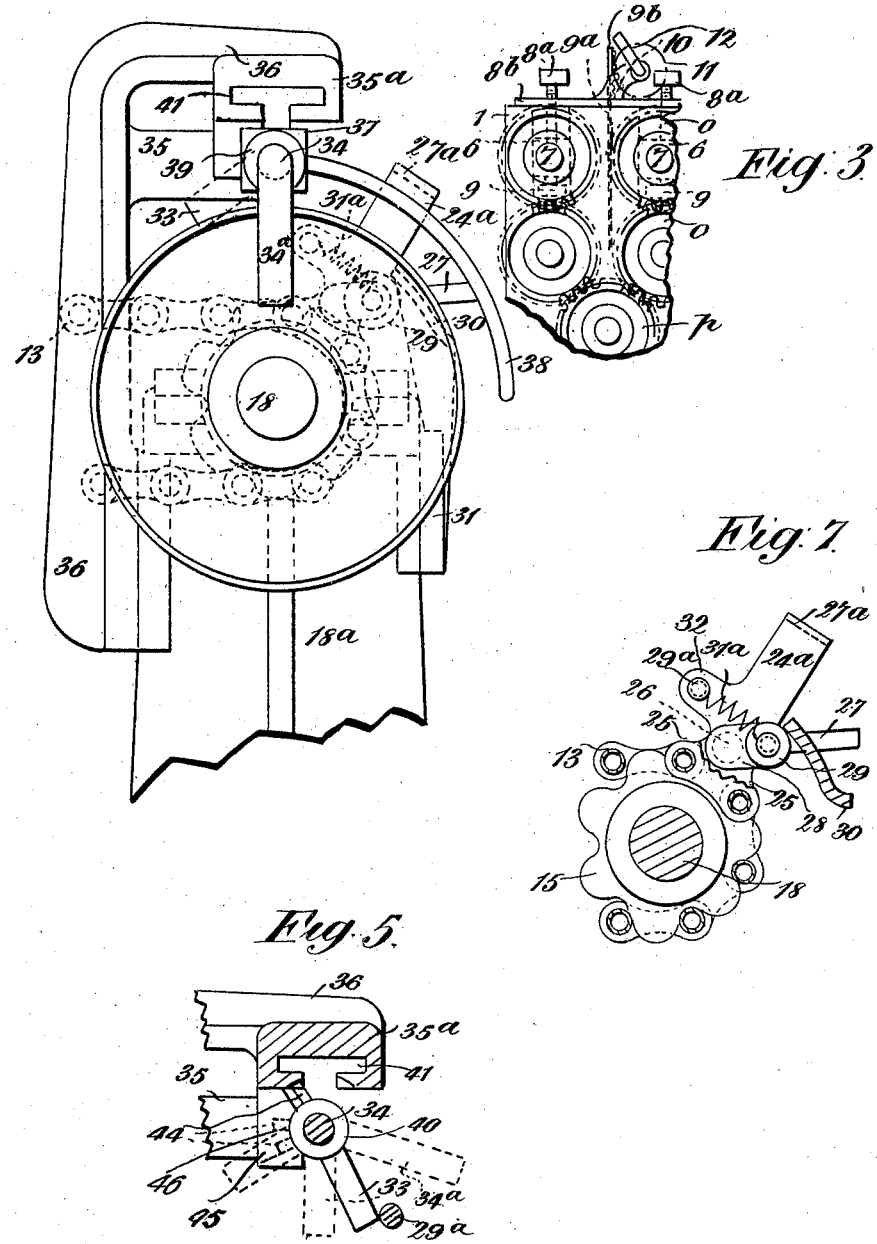

R. L. PRITCHARD.
PROCESS FOR THE SEPARATION OF FIBERS FROM THE STALKS OF BAST PLANTS AND OTHER ADHERENT FIBERS.
APPLICATION FILED MAR. 3, 1915.

1,315,328.

Patented Sept. 9, 1919.
8 SHEETS—SHEET 6.

R. L. PRITCHARD.
PROCESS FOR THE SEPARATION OF FIBERS FROM THE STALKS OF BAST PLANTS AND OTHER ADHERENT FIBERS.
APPLICATION FILED MAR. 3, 1915.

1,315,328.

Patented Sept. 9, 1919.
8 SHEETS—SHEET 7.

R. L. PRITCHARD.
PROCESS FOR THE SEPARATION OF FIBERS FROM THE STALKS OF BAST PLANTS AND OTHER ADHERENT FIBERS.
APPLICATION FILED MAR. 3, 1915.
1,315,328.
Patented Sept. 9, 1919.
8 SHEETS—SHEET 8.
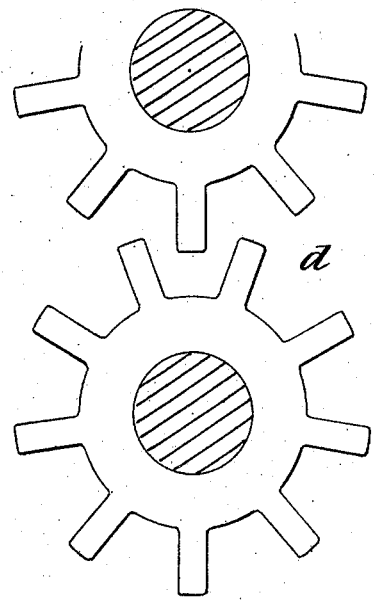
Fig. 10.
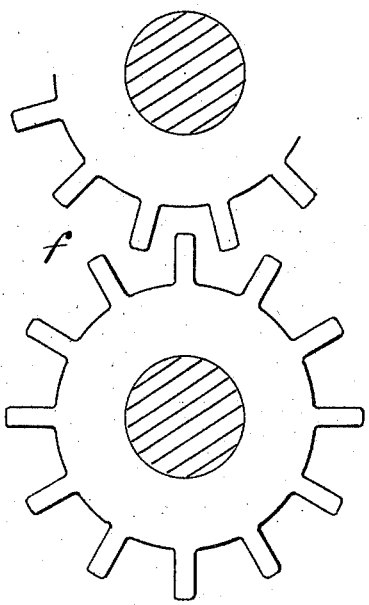
Fig. 11.
Fig. 12.
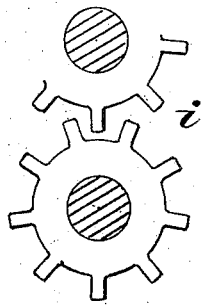
Fig. 13.
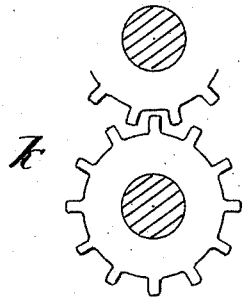

UNITED STATES PATENT OFFICE.

REUBEN LEVI PRITCHARD, OF LONDON, ENGLAND.

PROCESS FOR THE SEPARATION OF FIBERS FROM THE STALKS OF BAST-PLANTS AND OTHER ADHERENT FIBERS.

1,315,328.  Specification of Letters Patent.  Patented Sept. 9, 1919.

Application filed March 3, 1915. Serial No. 11,909.

*To all whom it may concern:*

Be it known that I, REUBEN LEVI PRITCHARD, a citizen of the United States of America, residing in London, England, have invented certain new and useful Improvements in Processes for the Separation of Fibers from the Stalks of Bast-Plants and other Adherent Fibers, of which the following is a specification.

The bast plants, such as flax, hemp, jute and ramie, grow in the form of cylindrical stalks of a woody substance surrounding a soft pith in its center, with the fibers upon the outer surface constituting an outer cortex. The fibers are covered upon all sides with gum, which, on their inner surfaces, adheres them to the woody stalk or boon; and that on their outer surfaces is mixed with silicious or other substances forming an external cuticle or epidermis, which adheres the fibers to each other. The separation of the fibers is their loosening from the boon and external cuticle.

Hitherto the separation of the fibers of the plants for commercial purposes has been almost entirely effected by loosening them from the boon by first setting up a fermentation of the adhering gum and afterward separating the fibers from each other by mechanical action. The fermentation is the same for all bast plants, and is known as retting; and the mechanical action comprises a breaking of the woody boon of flax or a peeling of the cortex of fibers of the larger basts, and a beating of the loosened fibers known as "scutching." The "retting" takes place under favorable conditions of moisture and warmth upon all sides of the fibers, proceeding, however, more rapidly in the gum adhering them to the boon than in the external cuticle; and as soon as the fibers are loosened from the boon the retting must be checked by drying the plants, although the retting of the external cuticle is incomplete. The complete disintegration of the external cuticle is effected afterward by the scutching.

Both the retting and the scutching may, and to a large extent do, injure the fibers by the retting action extending to them if it is not checked as soon as the fibers are loosened from the boon; and the scutching breaks many of the fibers in beating them apart. Many devices to loosen the fibers from the boon without retting exist, depending on a chemical action or a high temperature to dissolve the adhering gum, with which my invention has nothing in common as the action of my invention is mechanical. Mechanical devices exist which act by crushing the stalks and breaking the boon into small pieces, and that forcibly pull the fibers from their adhesions. The crushing bruises the fibers in the outer cortex; and the pulling either imperfectly separates the fibers from each other in flat bands with small particles of boon adhering, or if completely separated from each other many of the individual fibers are broken.

My invention relates to a mechanical loosening of the fibers from the boon and a disintegration of the external cuticle produced by passing the plants between a series of pairs of revolving rollers of special construction, arrangement and running. The rollers are of different diameters, and mainly fluted, the fluted rollers having ribs and flutes of special formation, and of varying sizes; the fluted rollers of every pair being fixed and incapable of being separated from each other by the resistance of the material, and the rollers arranged in separate zones that revolve at different speeds in distinct zones which are all independent of each other, though the speed of the rollers comprising a zone is the same. The invention provides, moreover, improvements in the feeding of the plants to the mechanism, and the removal of separated fibers from the mechanism. The material carried between the revolving rollers is maintained in a condition of tension within each zone, but between the zones the material is in a relaxed state. The material being tense within the zones, the woody boon first, and afterward the external cuticle, break against the ribs of the fluted rollers, while the more flexible fibers, being only tense to the extent limited by the size of the zone, are carried between the rollers separated and uninjured. The invention is applicable to flax and other bast plants in all conditions, whether unacted upon in any way after harvesting, or which have the fibers loosened from the boon by retting or other means, and to adhering fibers whatever they may be after the distinctive nature of the plant is removed.

In order that the invention may be the better understood, drawings are appended illustrating a machine for the separation of fibers from unretted flax straw; such changes as may be necessary to adapt the machine to meet the physical condition of the same and other bast plants being hereinafter specified in the description.

In the accompanying drawings:—

Figure 1 is a side elevation of the right-hand end of a machine according to this invention.

Fig. 1$^a$ is a similar view of the left-hand end of the machine.

Fig. 2 is a plan of the right-hand end of the machine.

Fig. 2$^a$ is a similar view of the left-hand end of the machine.

Fig. 3 is an end view showing certain portions of the machine to a larger scale.

Fig. 5 is a section on line A A Fig. 4 looking in the direction of the arrow $x$.

Fig. 7 is a part sectional view of certain portions of the machine.

Figs. 10 to 13 are views illustrating the forms of the ribs upon the various fluted rollers.

Figure 4:
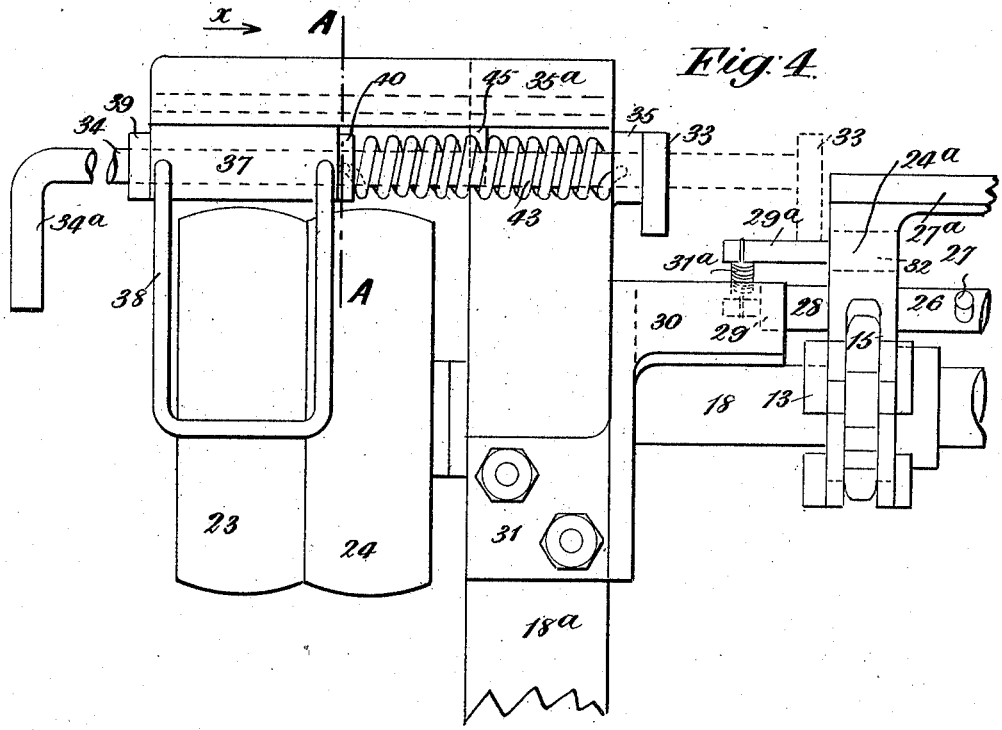
Fig. 4 is a side view of the parts shown in Fig. 3.

In the example illustrated the machine embodying the process comprises a number of fluted rollers arranged in successive zones, each zone comprising a plurality of pairs of fluted rollers, the rollers of each zone all rotating at the same speed and having the same diameter and number of flutes. The rollers are rigidly supported with respect to their vertical movement; the speed of rotation of the rollers of each zone being lower than the speed of the preceding zone; the number of flutes also being varied in certain zones. The material is passed successively through the zones, being taut within the said zones and relaxed outside said zones, and while passing therethrough it is sharply bent at a right angle to its line of movement. The material at certain points is subjected to the compressive action of plain rollers. Provision is made for feeding the material to the rollers, and for receiving it as it leaves the machine.

Referring to the appended drawings, 1 indicates the frame of the machine, which at one end is provided with rollers 2 carrying an endless feed band 2$^a$ upon which band the plants are first assembled preparatory to their entrance to the machine and by which they are fed to the rollers $a$.

The feed band 2$^a$ is actuated from the first lower roller, and its speed is the same as that of the first lower roller. The traveling feed band would carry the material in a disarranged condition until the roots of some would be alongside the middle or branch ends of others, which, however, is prevented by a rectangular member 3, the width of the feed band and of a length equal to the material worked. The free ends of the rectangular member rotate on pins, at the side and near the back end of the feed band. Its normal position is obliquely upward with the transverse part of the rectangular member some distance above the feed band; and before the plants or other material are placed upon the feed band, the far end is brought down upon the latter and fastened by any suitable means. The material is butted against the transverse part of the rectangular member, and when fully arranged the rectangular member is released, and it rotates obliquely upward to permit the traveling feed band 2$^a$ to carry the material to the machine. It is maintained obliquely upward until the material has passed the transverse part of the rectangular member, when it is again rotated downward and fastened. Before the material enters the first pair of rollers, it has to pass through a gate with vertical bars dividing the feeding into a number of equidistant spaces. This gate comprises a transverse bar 1$^a$ rigidly secured to the frame of the machine, and a number of vertical bars $a^2$ which descend below the plane of the band 2$^a$, and are fixed to a second transverse bar secured to the frame which strengthens them. The vertical bars secure the passage of plants or other material in a parallel condition one to the other, and at a right angle to the axis of the rollers.

The rollers $a$ just above referred to are two pairs of smooth rollers, which constitute the first zone, their function being to compress the plants and bring them into a substantially flat form and nearly equal thickness, rendering the boon more friable and ready to split longitudinally, and consequently more readily freed from the fibers during the subsequent action of the fluted rollers. While, as above stated, in the illustration given I have illustrated and described the first zone as being formed of two pairs of plain rollers, it is to be understood that I may, if found desirable, increase the number of said plain rollers according to the requirements of the plants treated. It is, however, contemplated that the number necessary to effect the desired operation, where flax is treated, will be from two to four pairs. In addition to the zone comprised of the rollers $a$ there are provided other pairs of smooth rollers $b$ $c$, located at other points of the machine, and which rollers act upon the plants after they have undergone treatment by the fluted rollers. Of the rollers $b$ and $c$ one is disposed as shown at or about the middle of the machine, and the other at the discharge end thereof: the function of the rollers $b$ being to compress such portions of the boon as may still remain upon the plant, while that of the roller $c$ is to remove the markings produced by the fluted rollers. Each of the smooth rollers are so mounted in their bearings that the upper of each of said rollers is capable of vertical adjustment; but the upper fluted rollers are so mounted that, while they may be adjusted to secure the proper depth of entry of the flutes of one into the spaces upon the coacting roll, will yet be incapable of having their position changed by the resistance of the material. A convenient method of mounting the upper fluted rollers is illustrated in Fig. 3, where 6 indicates a block perforated for the spindle 7 of the roller, the said block sliding in a recess 8, in the frame of the machine. Bearing upon the upper end of the block 6 is a set screw $8^a$, passing through a plate $8^b$, secured to the upper edge of the frame of the machine, the block at its lower end being supported by a set screw 9 tapped into the frame 1, and bearing at its upper end against the lower end of the block. After the vertical adjustment of the block has been effected by the set screw 9, the said block is secured against further movement by the set screw $8^a$. It may here be remarked that where the plants to be treated are hemp, jute and ramie, which have been previously retted and peeled from the stalks, the smooth rollers may be dispensed with. The amount of compression necessary for the unretted larger plants just referred to is greater than that required where flax is treated. Where the plants still retain the seed, they are passed, prior to their submission to the machine, between heavy smooth rollers, without compression, which, before compressing the plants, break the seed bolls. I may, if desired, combine these heavy rollers for the treatment of the seed with the present machine; but in practice it may be found more economical to provide rolls for the said treatment of the seed, when necessary, which are independently worked of the said machine.

The fluted rollers comprising the remaining zones $d$ to $m$ inclusive, are each provided with ribs of rectangular cross sectional outline, as shown in Figs. 10 to 13, and rounded only at the edges. As will be seen on reference to Figs. 10 to 13, the ribs of the rollers of the various zones are varied, both in number and size. Fig. 10 representing rollers such as would be employed for the zones $d$ and $e$, Fig. 11 those for zones $f$ and $g$ and $h$, while Fig. 12 illustrates rollers such as would be employed for the zones $i$ and $j$, and Fig. 13 rollers for zones $k$, $l$ and $m$. The rollers are each positively driven through the pinions $o$, shown upon the left-hand side of the machine, and secured to the spindles of the various rollers, and idlers $p$ convey motion from one roller in the zone to another. The motion for the rollers is primarily derived from the aforesaid main shaft 6, and is transmitted therefrom through suitable gear wheels, shown dotted in Fig. 1, and disposed upon the right hand side of the machine, looking from the feed end thereof. Each zone is independent of all the others, and the rollers of each of said zones are driven at a speed somewhat less than that of the preceding zones, the reduction of speed being suitably proportioned to prevent the breaking of the material. In practice it is contemplated that a fall of from 5 to 10 per cent. in the speed of each zone, both of plain and fluted rollers, will be sufficient to effect the desired object. It will, however, be understood that the rate of speed, number of flutes and size of the rollers, and the number of zones, will vary with the material worked and whether it be for a loosening of the fibers from the boon and external cuticle or from the external cuticle only; or merely for the separation of adherent fibers. In this respect it may be stated that while I have described and illustrated the majority of the zones as comprising three pairs of rollers, I do not desire to limit myself to this number. I have, however, found in practice with three pairs of rollers the material is held within the zone at a tension calculated to secure the best effect. If the number of rollers in a zone exceed three pairs the tension of the material behind the first three rollers is increased by every additional pair of rollers until it reaches a point where the fibers will be broken, the breaking increasing more and more as the said fibers are separated from each other. With only two pairs of fluted rollers to a zone, the material is slack behind the first pair of rollers and in front of the second pair, and there will be a deficient breaking of both the boon and the outer cuticle. As the woody boon has been well broken and fallen away, after leaving the intermediate smooth rollers $b$, the rollers of the remaining zones may be less in circumference, and are placed as close together as possible, provided always that the ribs of the respective rollers do not contact one with the other. The spacing of the rollers in all cases is regulated with a view to prevent the material being deflected downward by its own weight, and so preventing its proper presentation to the various rollers. The comparatively open spacing of the first zones, moreover, permits the ready falling away of any particles of boon which are separated from the fibers. The final discharge of the fibers is effected through the last pair of the smooth rollers indicated by $c$. Except for the pressure due to its tension, the plant being taut as it passes between the fluted rollers, there is no pressure otherwise imposed upon it, or is it at any time compressed between the adjacent faces of the ribs of the rollers, the adjustment of the centers of the rollers and the ribs being so proportioned as to secure ample clearance between the base of the recesses and the sides of the ribs.

Figure 6:
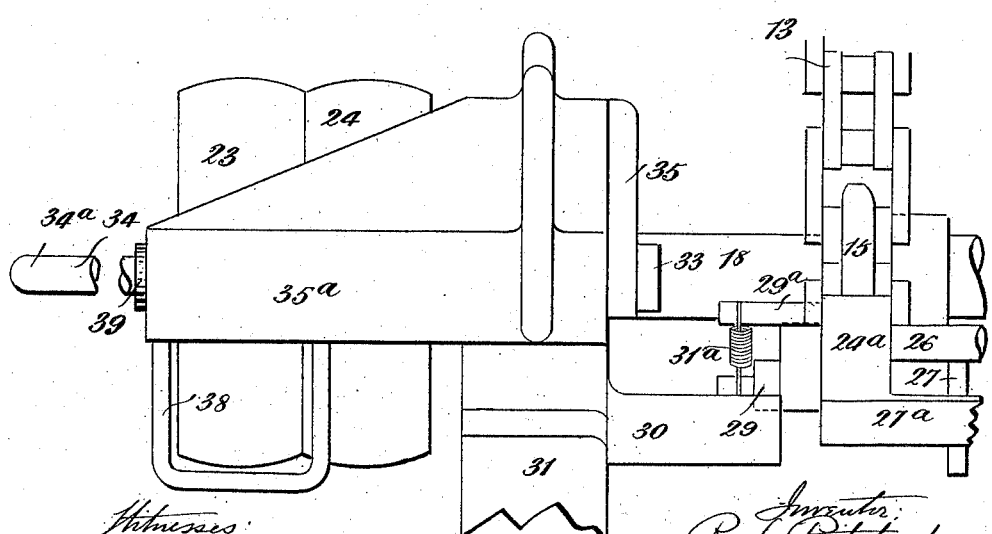
Fig. 6 is a plan of the parts shown in Figs. 3 and 4.
Figure 8:
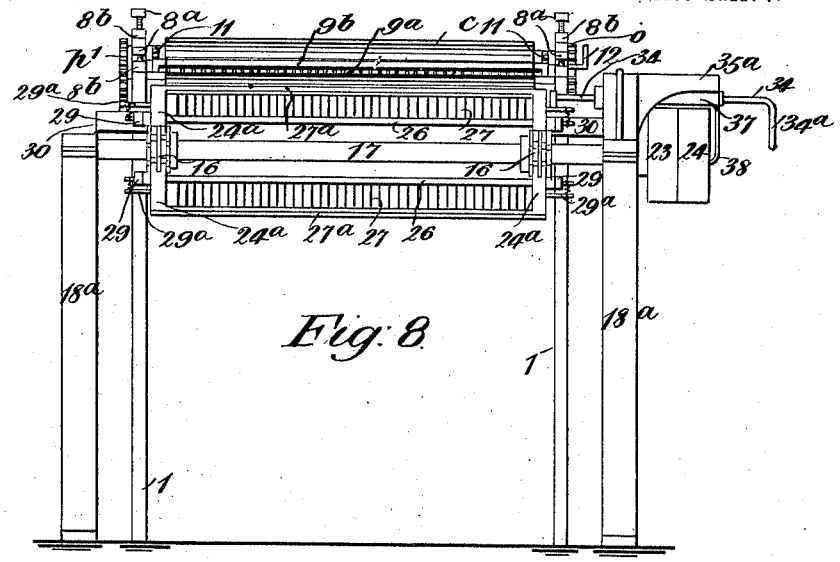
Fig. 8 is a rear end view of the machine.
Figure 9:
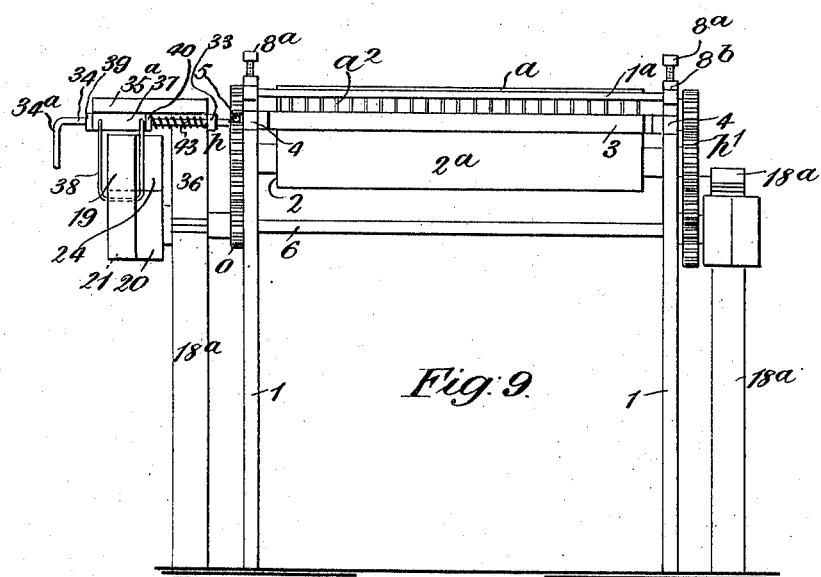
Fig. 9 is a front end view of said machine.

Prior to the entrance of the fibers between the last smooth rollers $c$ the fibers pass through the comblike device $9^a$ shown in Figs. $1^a$, $2^a$, 3, 8 and 9, and which device is located in front of the last pair of rollers, which are smooth. The device $9^a$ comprises a cross bar $9^b$ provided at each end with racks 10, engaged by pinions 11, which pinions are mounted on a spindle at each end, in brackets which may conveniently form part of the plates $8^b$. At one end the spindle $11^a$ is provided with a handle 12 by means of which the spindle and pinions 11 may be rotated, whereby the comblike device $9^a$ is lowered between the fibers as soon as the latter are engaged by the last pair of smooth rollers, which combs the fibers free of any particles of boon or short tow that may have become entangled between the fibers. As soon as the fibers have become free of the last pair of rollers, by means of the handle 12 the device $9^a$ is raised, so as to be no hindrance to a fresh supply of fibers passing between the last pair of rollers; and the comblike device is lowered again when the fibers have entered the latter. The fibers from the last pair of rollers are received by a delivery device, Figs. 3, 4, 6 and 7, which comprises two endless chains 13, 14, passing over chain wheels 15, 16, suitably spaced and mounted upon the shafts 17, 18, supported by standards $17^a$, $18^a$ and of which shafts 18 is driven by the belt 19 from pulleys 20, 21, mounted upon the main shaft 6, of which pulley 20 is freely mounted on said shaft. The motion of the pulley 21 is transmitted by a belt 19 to a pulley 23 mounted upon the left hand end of shaft 18. A loose pulley 24 is also mounted upon shaft 18. The lineal movement of the chains is equal to the peripheral movement of the rollers $c$. Arranged at suitable intervals on the chains according to the length of the plants, are a number of substantially U shaped frames $24^a$ at equal distances from each other, so that when traveling forward with fiber there should be the same number of frames traveling back to the machine empty; and when stationary there should be simultaneous delivery of fibers from the machine while at the far end there is a removal of the fibers from the frames. The attachment of the frames to the said chains may conveniently be effected by slitting the end members of the frames and forming lugs 25, perforated for the passage of the pins connecting the links of the chains, so that the ends of the frames take the place of links, as will be readily understood on reference to Figs. 3 and 7 of the appended drawings.

Passing through the side members of the frame is a bar 26, provided with pins 27, which normally loosely touch the horizontal member $27^a$ of the frame. This bar may be rocked in its bearings to swing the pins backward out of the frame about half an inch. As the fibers issue from the last pair of smooth rollers the frame $24^a$ nearest the machine being then stationary has the bar through its side members rotated backward until the free points of the pins touch almost the last lower roller, when the issuing fibers pass over the bodies of the pins and enter the frame. The bar is then rotated forward and the pins return to the frame, and the fibers are locked against the cross member $27^a$ of the frame $24^a$. During this operation the chains are stationary; but when the fibers are held as above described the chains are set in motion and the frames move forward at a speed equal to the speed with which the material is discharged by the rollers $c$. The actuation of the bar carrying the pins and the starting of the chains may be effected by an operator placed at this point, but I may, if desired, arrange for the operation of the pins and the stopping of the chains to be effected automatically. In the drawings I have illustrated mechanism for effecting these operations automatically; and in the case of the bar 26 this is accomplished by the provision of an arm 28 shown more clearly in Figs. 3, 4, 6, 7, secured one at each end of bar 26, and which arms carry rollers 29 adapted to engage the inner surface of the curved plate 30, supported from brackets 31, one of which is attached to the columns or standards $18^a$ supporting the shaft 18. A spring $31^a$ is attached at one end to an extension projecting from the pin carrying roller 29 and at the other end the said spring is connected to a pin $29^a$ projecting from a lug 32 upon the end members of the frame 24. The action of the spring is to maintain the bar 26 in a position such that the pins 27 are bearing against the transverse member $27^a$ of said frame; but as the frame moves toward the vertical position, the roller 29 is engaged by plate 30 and pulled backward against the action of spring 31, the pins 27 then occupying the position shown in the drawings when the further movement of the chains is stopped until again started by the operator. The automatic stopping of the chains is effected by means of the plate 33, mounted upon the end of the spindle 34, which is supported in the arm 35 of bracket 36, mounted on standard $18^a$. The spindle 34 passes freely through the sliding block 37, carrying the belt fork 38, for belt 19. Collars 39 40 are provided upon spindle 34, one disposed at each end of the sliding block, which block upon its upper surface is provided with a T shaped projection engaging a slide way 41 in the head 42 on bracket 36. The collars, while they permit the ready rotation of spindle 34, at the same time cause the block 37 to partake of the longitudinal motion of the said spindle. Encircling the spindle 34 between the rear end of block 37 and the inner face of arm 35, is a helical spring 43, the ends of said spring being secured respectively to the collar 40 and arm 35. Projecting from the inner portion of the periphery of the collar 40 is a pin 44, see Figs. 3 and 5, and projecting from the under surface of the head 42 of bracket 31 is a wall 45, recessed on its outer face at 46, so as to form a retaining projection or hump, which, when the spindle 34 is pushed inward, by means of the handle 34$^a$, and given a partial rotation, holds the spindle against the combined expansive and rotary motion due to the tension given to the spring. When in the position just described the plate 33 is in the path of the pin 29$^a$, which as it moves into the position shown contacts with said plate, and, pushing it to one side, imparts a rotary motion to spindle 34 causing the pin 44 to leave its recess, when the spring causes a further sharp rotary motion of the spindle carrying plate 33 clear of the path of pin 29$^a$, and at the same time allowing the spring to expand and pushing the spindle inward so that the belt fork 38 moves the belt 22 on to the loose pulley and the chains are brought to rest, and so remain until they are again set in operation by the manipulation of spindle 34 by the attendant. In Fig. 5 the plate 33 is shown in the three positions, those in full lines showing it prior to its engagement with pin 29$^a$ and the others when in the position where the pin 44 is free of the retaining recess and finally its terminal position effected by the recovery of spring 43. In order to start the chains 13 and 14 and effect the gripping of the material, when a sufficient length of the said material has been fed on to the pins 27 in frame 24$^a$, the operator grasps the handle on the end of spindle 34 and pulls the said spindle toward him. This causes the belt 19 to be moved on to the fast pulley starting the chains, the first movement of which carries the roller 29 clear of its retaining surface 30, when the spring 31 causes the bar 26 to rotate and the pins to engage the transverse member 27$^a$ of frame 24$^a$, securing the ends of the fiber. As soon as the frames 24$^a$ have traveled a sufficient distance to prevent their fouling the plate 33, a partial rotation is given to spindle 34, bringing plate 33 in position ready to be engaged by the pin 29$^a$ of the next advancing frame 24$^a$, said spindle being retained in this position as already explained, by the engagement of pin 44 with its retaining recess in the outer surface of wall 45.

The material held by the pin 27 is carried forward; and when finally free of rollers $c$ the fibers are freely suspended, which permits any particles of boon entangled between the fibers to fall away while traveling. When the frames 24 reach the end of the upper run of the chains, the fibers are grasped by an operator stationed at this point, and pulled free of the pins 27, thereby combing the ends of the fibers which had been engaged in the last pair of smooth rollers, removing tow and particles of boon from these ends.

This delivery is for long material; but if the material is short from having been previously broken into short pieces by the ordinary threshing, the fibers are delivered upon an endless belt or table provided with carding mechanism so as to remove pieces of boon from the short fiber.

Obviously, changes may be made in the arrangement of the machine as may in practice be found necessary or desirable.

Claims:

1. A method of separating fibers from bast plants and other adherent fibrous substances consisting first, in rendering the material longitudinally tense and laterally unrestrained and unconfined; second, while in this condition bending the material sharply and quickly almost to a right angle alternately in opposite directions; the tense unconfined areas being limited in length to that required to effect the sharp bending; third, the tense areas succeed each other throughout the whole length of the material and which areas are continuous with each other throughout, the material between adjoining areas remaining relaxed; fourth, that as the fibers are being progressively separated and the material becomes finer and of reduced thickness the length of the areas are reduced and the sharp bendings in said areas are made with increased speed and the spaces between the bending points are reduced; fifth, the material is not subjected to pressure upon the convexity of the alternate bendings when the latter are made.

2. A method of separating fibers from bast plants and other adhering fibers consisting in rendering fibrous material tense in limited areas between which the material is relaxed, and bending the material in the tense areas under the following conditions; first, the bending is made sharply and quickly almost to a right angle in alternate opposite directions; second, the tense bending material is also free from lateral pressure on the convexity of the bend; third, the extent of the tense areas in the material is no longer than the making of the sharp bending in it requires, and as the separation of the fibers proceed the tense areas are successively made of smaller extent with the quickness of the bending increased and the length of the material between the bending points diminished; fourth, the material successively goes through a number of bending areas in all of which it is bent sharply and quickly and in all the bending areas it is unconfined; and fifth, while going through several bending areas the material travels through each area with the same speed, such speed however being relatively diminished in every succeeding area and superficially increased in certain succeeding areas as the separation of the fibers progresses.

3. A method of separating fibers from bast plants and other adhering fibers consisting in first making the fibrous material of uniform dimensions and thickness along its length; second, as the succeeding material is rendered uniform in thickness and approximately of uniform dimensions the latter is held tense in limited areas interrupted by spaces in the material remaining relaxed; third, the material is laterally free from pressure and unconfined between solid opposing surfaces; fourth, when uniformly tense and unconfined it is made to bend sharply and quickly almost at a right angle in alternate opposite directions; fifth, that the linear extent of each tense area is only sufficient to permit the quick and sharp alternate bending; sixth, as the separation of the fibers progress—the linear extent of succeeding areas is reduced, and in them the size of the bendings is also reduced and the quickness of the bendings is increased; seventh, the same material is successively taken up in a number of succeeding bending areas progressively of smaller extent; eighth, the material travels through the number of succeeding areas, through each at the same uniform speed, but at a relatively slower speed in every succeeding area its superficial speed however being faster in certain succeeding areas; and ninth, maintaining and rendering the material of uniform dimensions in certain succeeding tense areas prior to the material becoming tense and unconfined in them.

4. A machine for the purpose described constructed with a number of fluted rollers arranged in a number of consecutive zones, each zone comprising a number of fluted rollers which mesh in pairs, all the said rollers in each zone being interdependent, the depth of the meshing of the fluted rollers within the opposing flutes being constant and unchangeable, the flutes being spaced so that the material passing between the rollers can only be pressed upon by the engaging ribs and without pressure at the sides and bottoms of the flutes, the fluted rollers in each zone being of uniform carrying capacity and revolving at a uniform speed, both of which are relatively reduced in every succeeding area, but in certain succeeding zones the dimensions of the rollers and ribs permit the number of revolutions of the rollers and of the bendings to be increased notwithstanding the fact that the speed of the material passing through them is reduced.

5. In a machine for the purpose described consisting of a plurality of meshing fluted rollers arranged in several zones, each of the zones comprising a plurality of said rollers which in dimensions and running are interdependent and which revolve in fixed bearings, meshing to the same depth continuously within the flutes of the opposing roller, the flutes being spaced so that material passing between the meshing rollers is not compressed against the sides of the rib or confined between the crown of the rib and the bottom of the flute; the rollers being made to run at a uniform carrying speed throughout each zone, which speed is reduced in every succeeding zone, and though reduced in certain succeeding zones, the number of revolutions of the rollers and the number of bendings of the material passing between them are increased.

6. A machine for the purpose described comprising fluted rollers mounted in fixed bearings having ribs of rectangular cross-sectional outline, the rollers being arranged in zones consisting of meshing pairs of rollers, the several pairs of rollers of each zone being interdependent, the flutes of the opposing rollers being so spaced and meshing in such a manner that the flutes do not compress and confine material passing under and over the said ribs, said rollers revolving at a uniform carrying speed for any zone which speed is less in every succeeding zone though in certain succeeding zones the number of revolutions of the rollers and the bendings of the material passing between the rollers being also increased.

7. In a machine for the purpose described, the combination of smooth and fluted rollers, the smooth rollers preceding the fluted and being also combined with the latter in certain zones, said smooth rollers revolving in pairs, one of which is mounted in fixed and the other within resilient bearings permitting the material to force the rollers apart against pressure, the fluted rollers having ribs of rectangular cross-sectional outline and all running in fixed bearings with the ribs of one fluted roller engaging within the opposing flutes of the other, which flutes are so spaced as not to compress and confine material passing between them, the running of the smooth rollers being independent of that of the fluted rollers and of each other, the running of the said fluted rollers being uniform in all the zones, as to their carrying of material throughout the zone, which running is relatively reduced in every succeeding zone, and at the same time the dimensions of the rollers in certain of the succeeding zones being such as to allow the speed of superficial running and of the bendings to be increased.

8. In a machine for the purpose described the combination with pairs of fluted rollers arranged in zones running in fixed bearings and provided with ribs or rectangular cross-sectional outline, of a continuous traveling apron upon which the material is fed to the machine, and a transverse member extending across the apron upon it to restrain the advance of the material until the ends of the material are abutted, and means whereby the transverse member is raised upward to a required height allowing a determined quantity of the material to be carried to the machine, thereby regulating the quantity of material passing through the machine so that it may pass through the machine unconfined between the ribs of opposing rollers.

9. In a machine for the purpose described the combination with pairs of fluted rollers arranged in zones, running in fixed bearings and provided with ribs of rectangular cross-sectional outline, of a number of vertically depending bars set in a frame and located in front of the rollers, the material passing to the machine between the depending bars which make the material parallel and at a right angle to the rollers so that the material can be made longitudinally tense in the fluted rollers.

10. In a machine for the purpose described the combination with pairs of fluted rollers arranged in zones rotated in fixed bearings and provided with ribs of rectangular cross-sectional outline of means for ridding the separated fibers from short fibers or tow and other extraneous particles, comprising a row of rods descending between the fibers after their forward end is grasped by and drawn between the last pair of rollers said fibers passing through the spaces between the descending rods, with means for moving these rods vertically downward and upward.

11. In a machine for the purpose described the combination with a plurality of pairs of fluted rollers arranged in zones, running in fixed bearings and provided with ribs of rectangular cross-sectional outline, of means for the freeing of the forward end of the separated fibers from tow and other particles by having the forward uncleaned end of the fibers fall upon the bodies of pins which are afterward made vertical and the fibers are retained by a transverse member, from which in the final removal of the fibers by drawing them downward and backward the fibers fall into the spaces between the pins and are drawn alongside the bodies of the pins.

12. In a machine for the purpose described the combination with pairs of fluted rollers arranged in zones running in fixed bearings and provided with ribs of rectangular cross-sectional outline dimensioned to allow material to pass between them and to be laterally unconfined, means for ridding the forward end of the separated fibers from tow and other extraneous particles, consisting in the delivery of the fibers from the rollers upon pins set in a spring actuated revoluble bar contained in a cross frame equal in width to the width of the machine and fastened upon two endless chains, an arm on said bar, a cam for engaging said arm and turning the revoluble bar outward and backward when the cross frame is made stationary, said bar being turned inward and forward by the spring when the cross frame is carried forward upon the endless chains, the fibers being retained between the pins and cross frame; with means for setting the endless chains carrying the cross frames in motion forward consisting of a belt passing through a fork, a spring pressed rod carrying said fork, an arm on said rod, a handle for operating the spring pressed rod for setting the endless chains in motion, and effecting the automatic stopping of the chains bringing the cross frames to a stop and turning the revoluble bar backward and outward.

13. A machine for the purpose described comprising a plurality of pairs of fluted rollers arranged in zones running in fixed bearings with the same speed for all the rollers of each zone and a relatively reduced speed in every succeeding zone, the fluted rollers having ribs of rectangular cross-sectional outline; pairs of smooth rollers resiliently mounted preceding the fluted rollers and at other points within the zones of fluted rollers; means for feeding the material comprising an endless band and a transverse member arranged across the band capable of swinging upward from the endless band; descending vertical rods placed before the rollers with the material passing through the space between the rods; means for freeing the separated fibers from tow and other particles comprising vertically moving rods descending between the fibers in the space before the last roller, and pins set on revoluble bars within cross frames carried on endless chains, springs acting upon the bars, cams for turning the revoluble bars out of the frames; arms on the bars contacting with the cams, means for setting the endless chains in motion consisting of a belt passing through a fork upon a spring pressed rod, an arm at the inner end of said rod, a handle for operating the spring pressed rod for starting the endless chains, and effecting the automatic stopping of the said chains rendering the cross frames stationary and rotating the revoluble bars backward and outward by the respective engagement with the frames of the arm of the spring pressed belt controlling rod, and the engagement of the arm upon the revoluble bar of the cross frames with the cam.

In witness whereof I have hereunto affixed my signature in the presence of the undersigned witnesses.

REUBEN LEVI PRITCHARD.

Witnesses:
JOHN H. JACK,
G. H. PETERS.

Copies of this patent may be obtained for five cents each, by addressing the "Commissioner of Patents, Washington, D. C."